UNITED STATES PATENT OFFICE.

ADOLF SPIEGEL, OF GRUBE MESSEL, NEAR DARMSTADT, GERMANY.

SULPHUR COMPOUND.

SPECIFICATION forming part of Letters Patent No. 495,124, dated April 11, 1893.

Application filed May 17, 1892. Serial No. 433,337. (Specimens.) Patented in Germany June 15, 1890, No. 56,401; in England November 29, 1890, No. 19,502, and in France December 2, 1890, No. 209,960.

*To all whom it may concern:*

Be it known that I, ADOLF SPIEGEL, a subject of the Emperor of Germany, resident at Grube Messel, near Darmstadt, Germany, have invented new and useful Improvements in the Production of Sulpho Compounds, (for which I have obtained Letters Patent in Germany, No. 56,401, dated June 15, 1890; in France, No. 209,960, dated December 2, 1890, and in England, No. 19,502, dated November 29, 1890,) of which the following is a specification.

It is a well known fact that when mineral oils are purified by means of sulphuric acid the latter removes basic bodies as well as those which are known by the general name of "acid tar;" also, that by washing the latter with water the adhering sulphuric acid may be removed and thus a tarry substance obtained which is insoluble in water.

It has been proved that among the tarry substances mentioned some of which derive from bodies analogous to pyrrol, there are other compounds which are highly unsaturated and easily converted into sulphonic acids when strong or fuming sulphuric acid is made to act more energetically on them. These sulphonic acids are bodies which either in the form in which they are thus obtained or in that of their alkaline salts are easily soluble in water. It has been further shown that these sulphonic acids are easily obtainable from any mineral oil whether it be oil found already formed in the earth or prepared by dry distillation of bituminous schists or lignite; also, that such acids may be prepared in an analogous manner from rosin oil the product of distillation of rosin.

The general occurrence of the non-saturated mother substances of the aforesaid sulphonic acids in all mineral oils forms a characteristic difference from the limited number of oils rich in sulphur containing upward of ten per cent. of this element which it has long been known yield on treatment with sulphuric acid the sulphonic acid known by the name of "ichthyol."

Certain species of sulpho-compounds may have occasionally been produced incidentally in some processes of purifying mineral oils, but such products have not been in such condition that they were available for any use whatever, and were discarded.

My invention consists in the process hereinafter described and embodied in the claim whereby I am enabled to separate from the foreign substances in the mineral oils, the sulpho-compounds in such condition and purity that they are capable of being utilized.

The mother substances of my new sulphonic acids and sulphones, are in fact simple hydrocarbons and their convertibility into sulphonic acids does not depend on the presence of sulphur of combination.

The new sulphonic acids possess the following properties:—In the undried condition the sulphonic acids form a sirupy body of a spicy taste drying at 110° centigrade to a pulverizable residue. They are easily soluble in water and are precipitated from this solution on the addition of common salt, hydrochloric or sulphuric acid. The alkaline salts are likewise soluble and may be salted out in the same way as the soaps of fatty acids. On the other hand their salts of the alkaline earths and of the oxides of the heavy metals (with the exception of those of a few such as mercury and antimony) are insoluble in water. They are further distinguished by their property of precipitating glue and gelatine from slightly acid solutions with the formation of an elastic caoutchouc-like precipitate which may be drawn into threads. In consequence of their unsaturated character the said sulphonic acids are easily oxidized, their very formation being accompanied by an oxidation and the evolution of sulphur dioxide consequent on the reduction of the sulphuric acid employed in sulphonating. The addition of an excess of ferric chloride to a solution of tumenolsulphonic acid causes the formation of a precipitate and the simultaneous reduction of ferric to ferrous chloride. Mercuric chloride is reduced to calomel on boiling with tumenol-sulphonic acid and boiling with bichromate causes the formation of an insoluble precipitate.

*Preparation.*—Although the unsaturated hydrocarbons contained in mineral oils need but heating with concentrated sulphuric acid to be sulphonated, more of sulphonic acid and less of sulphones are obtained when fuming sulphuric acid is employed as follows: One hundred pounds of a hydro-carbon, such as a distillate of mineral oils say of specific gravity of 0.860 to 0.890 are freed from creosotes and acids, by the aid of caustic soda-lye, and from bases and pyrrolic bodies, by the aid of sulphuric acid, of seventy per cent., then heated to 80° centigrade. As soon as this temperature is reached, twenty pounds of fuming sulphuric acid, testing ten per cent. of sulphuric anhydride, are rapidly stirred in. There is a rise of temperature and a considerable evolution of sulphur dioxide. The liquid is allowed to cool down and settle whereupon the supernatant oily part is decanted and the remaining acid sirupy part run into boiling water while vigorously stirring the latter. So far as the sulphuric acid present does not of itself precipitate the sulphonic acid, common salt is added to throw down the sulphonated products which are next collected on a filter dissolved in water and re-precipitated by the addition of common salt until all sulphuric acid is removed. Finally, the sirup is mechanically freed from the adhering brine. It now presents a mixture of the sulphonic acids with sulphones. As will be shown, this mixture is soluble in water although its last named component by itself is insoluble in water. It may be separated into its constituent parts by converting it into the soda salt and extracting the latter with ether or naphtha. The ether dissolves the sulphones and leaves them on evaporation as a thick yellow or brownish fluid soluble in ether or benzene naptha or spirits of wine.

The sulphones are bodies derived from the same unsaturated hydrocarbons as the sulphonic acids but are less highly sulphonated and less highly oxidized. By acting more energetically on them with sulphuric acid they are easily converted into the sulphonic acids.

The soda-salt extracted as before stated yields the free sulphonic acids having the properties above described on dissolving it in water, precipitating with hydrochloric acid, washing to remove the chlorides, and drying to expel all traces of hydrochloric acid.

Having now particularly described and ascertained the nature of the said invention and in what manner the same is to be performed, I declare that what I claim is—

The process herein described for the production of sulpho-compounds by first treating hydrocarbons such as mineral oils with caustic soda, then with sulphuric acid, then washing the product with water and brine successively, then neutralizing the washed product with alkali-lye, and finally separating the salt and the sulphones by treating the mass with a solvent of the sulphones, substantially as set forth.

In testimony whereof I have signed my name to this specification in the presence of two subscribing witnesses.

ADOLF SPIEGEL.

Witnesses:
FRANZ HASSLACHER,
FRIEDRICH CORRELL.